US010915475B2

(12) United States Patent
Dubey et al.

(10) Patent No.: US 10,915,475 B2
(45) Date of Patent: Feb. 9, 2021

(54) METHODS AND APPARATUS FOR VARIABLE SIZE LOGICAL PAGE MANAGEMENT BASED ON HOT AND COLD DATA

(71) Applicant: Western Digital Technologies, Inc., San Jose, CA (US)

(72) Inventors: Rishabh Dubey, Bangalore (IN); Saugata Das Purkayastha, Bangalore (IN); Chaitanya Kavirayani, Bangalore (IN); Sampath Raja Murthy, Bangalore (IN); Nitin Gupta, Bangalore (IN); Revanasiddaiah Prabhuswamy Mathada, Bangalore (IN)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 268 days.

(21) Appl. No.: 15/782,829

(22) Filed: Oct. 12, 2017

(65) Prior Publication Data

US 2019/0114272 A1    Apr. 18, 2019

(51) Int. Cl.
*G06F 13/16* (2006.01)
*G06F 12/02* (2006.01)
*G06F 12/1009* (2016.01)
*G06F 12/0882* (2016.01)

(52) U.S. Cl.
CPC ...... *G06F 13/1694* (2013.01); *G06F 12/0246* (2013.01); *G06F 12/0882* (2013.01); *G06F 12/1009* (2013.01)

(58) Field of Classification Search
CPC ............ G06F 12/0246; G06F 12/0882; G06F 12/1009
See application file for complete search history.

(56) References Cited

U.S. PATENT DOCUMENTS

| | | | |
|---|---|---|---|
| 9,141,528 B2 | 9/2015 | Gorobets et al. | |
| 9,176,864 B2 | 11/2015 | Gorobets et al. | |
| 2009/0049234 A1* | 2/2009 | Oh | G06F 12/0246 711/103 |
| 2009/0259919 A1* | 10/2009 | Kilzer | G06F 11/1068 714/773 |
| 2009/0300276 A1* | 12/2009 | Torabi | G06F 12/0246 711/103 |

(Continued)

*Primary Examiner* — Michelle T Bechtold
(74) *Attorney, Agent, or Firm* — Loza & Loza, LLP; Gabriel Fitch

(57) ABSTRACT

Aspects of the disclosure provide for management of a flash translation layer (FTL) for a non-volatile memory (NVM) in a Solid State Drive (SSD). The methods and apparatus provide a logical to physical (L2P) table where a first portion of the table is used for mapping frequently accessed hot data to a first subdrive in the NVM. Additionally, a second portion of the L2P table is provided for mapping cold data less frequently accessed than the hot data to a second subdrive, where logical blocks for storing the cold data in the second subdrive are larger than logical blocks storing the hot data in the first subdrive. Separation of the L2P table into hot and cold subdrives reduces the L2P table size that is needed in RAM for logical to physical memory mapping, while at the same time provides lower write amplification and latencies, especially for large capacity SSDs.

18 Claims, 4 Drawing Sheets

(56) References Cited

U.S. PATENT DOCUMENTS

| | | | |
|---|---|---|---|
| 2010/0082883 A1* | 4/2010 | Chen | G06F 12/0246 |
| | | | 711/103 |
| 2011/0072194 A1* | 3/2011 | Forhan | G06F 13/14 |
| | | | 711/103 |
| 2012/0239862 A1* | 9/2012 | Seo | G06F 12/0246 |
| | | | 711/103 |
| 2012/0297121 A1 | 11/2012 | Gorobets et al. | |
| 2014/0181400 A1* | 6/2014 | Lin | G06F 3/0613 |
| | | | 711/114 |
| 2015/0227313 A1* | 8/2015 | Lee | G06F 12/1009 |
| | | | 711/103 |

\* cited by examiner

METHODS AND APPARATUS FOR VARIABLE SIZE LOGICAL PAGE MANAGEMENT BASED ON HOT AND COLD DATA

FIELD

The present disclosure relates generally to solid state drives (SSDs) including non-volatile memories (NVMs), and more specifically, to methods and apparatus for managing or controlling a flash translation layer (FTL) including variable size logical pages based on hot and cold regions being accessed in NVMs.

INTRODUCTION

In a variety of consumer electronics, solid state drives (SSDs) incorporating non-volatile memories (NVMs) are frequently replacing or supplementing conventional rotating hard disk drives for mass storage. These non-volatile memories may include one or more flash memory devices, such as NAND flash memories, and the flash memory devices may be logically divided into blocks with each of the blocks further divided into logically addressable pages. These logical pages may be any of a variety of sizes (e.g., 512 Bytes, 1 Kilobytes, 2 Kilobytes, 4 Kilobytes).

A Flash Translation Layer (FTL) within an SSD maintains logical to physical address mapping with a logical to physical (L2P) table. Each entry of an L2P table maintains mapping information for one host logical page. Typically, a logical page size is 4 Kilobytes (4 KB) with the corresponding entry size in the L2P table being 4 bytes. For a large capacity SSD, such as a 16 Terabyte (TB) SSD, the L2P table size will become 16 Gigabytes (GB). Allocating such a large L2P table in RAM memory of the SSD, however, becomes problematic at run time since SSDs typically do not have a RAM (e.g., a DDR DRAM) larger than 4GB for various reasons such as minimizing power consumption and cost. Also, known methods for mitigating the size of the L2P table such as increasing the logical page size or partial loading of the L2P table into RAM result in either higher write amplification or increased latency for host read and write operations. Accordingly, it would be beneficial to be able to reduce the L2P table size needed in RAM while still ensuring lower write amplification and latencies, especially for large capacity SSDs.

SUMMARY

According to an aspect of the present disclosure, a method of managing a Hash translation layer (FTL) for a non-volatile memory (NVM) is disclosed. The method includes providing a logical to physical (L2P) table with a controller or NVM controller that includes providing a first L2P table portion of the L2P table for mapping frequently accessed hot data to a first subdrive in the NVM. Furthermore, providing the L2P table also includes providing a second L2P table portion of the L2P table for mapping cold data less frequently accessed than the hot data to a second subdrive in the NVM, wherein logical blocks for storing the cold data in the second subdrive are configured to be larger than logical blocks for storing the hot data in the first subdrive.

According to another aspect, a solid state drive (SSD) is disclosed, which includes a non-volatile memory (NVM), and a controller communicatively coupled to a host device and the NVM. The controller is configured to generate a logical to physical (L2P) table that includes a first L2P table portion of the L2P table for mapping frequently accessed hot data to a first subdrive in the NVM. Additionally, the controller is configured to generate the L2P table to include a second L2P table portion of the L2P table for mapping cold data less frequently accessed than the hot data to a second subdrive in the NVM, wherein logical blocks for storing the cold data in the second subdrive are configured to be larger than logical blocks for storing the hot data in the first subdrive.

According to yet another aspect, a non-volatile memory (NVM) device including an apparatus for controlling a flash translation layer (FTL) in the NVM device is disclosed. The apparats includes means for generating a logical to physical (L2P) table including a first L2P table portion of the L2P table for mapping frequently accessed hot data to a first subdrive in the NVM. Furthermore, the means for generating the L2P table to include a second L2P table portion of the L2P table for mapping cold data less frequently accessed than the hot data to a second subdrive in the NVM, wherein logical blocks for storing the cold data in the second subdrive are configured to be larger than logical blocks for storing the hot data in the first subdrive. The apparatus also includes means for generating a first bitmap having at least one bit field configured to indicate whether a particular logical page to be accessed is available in the first L2P table portion of the L2P table.

DETAILED DESCRIPTION

Figure 1:
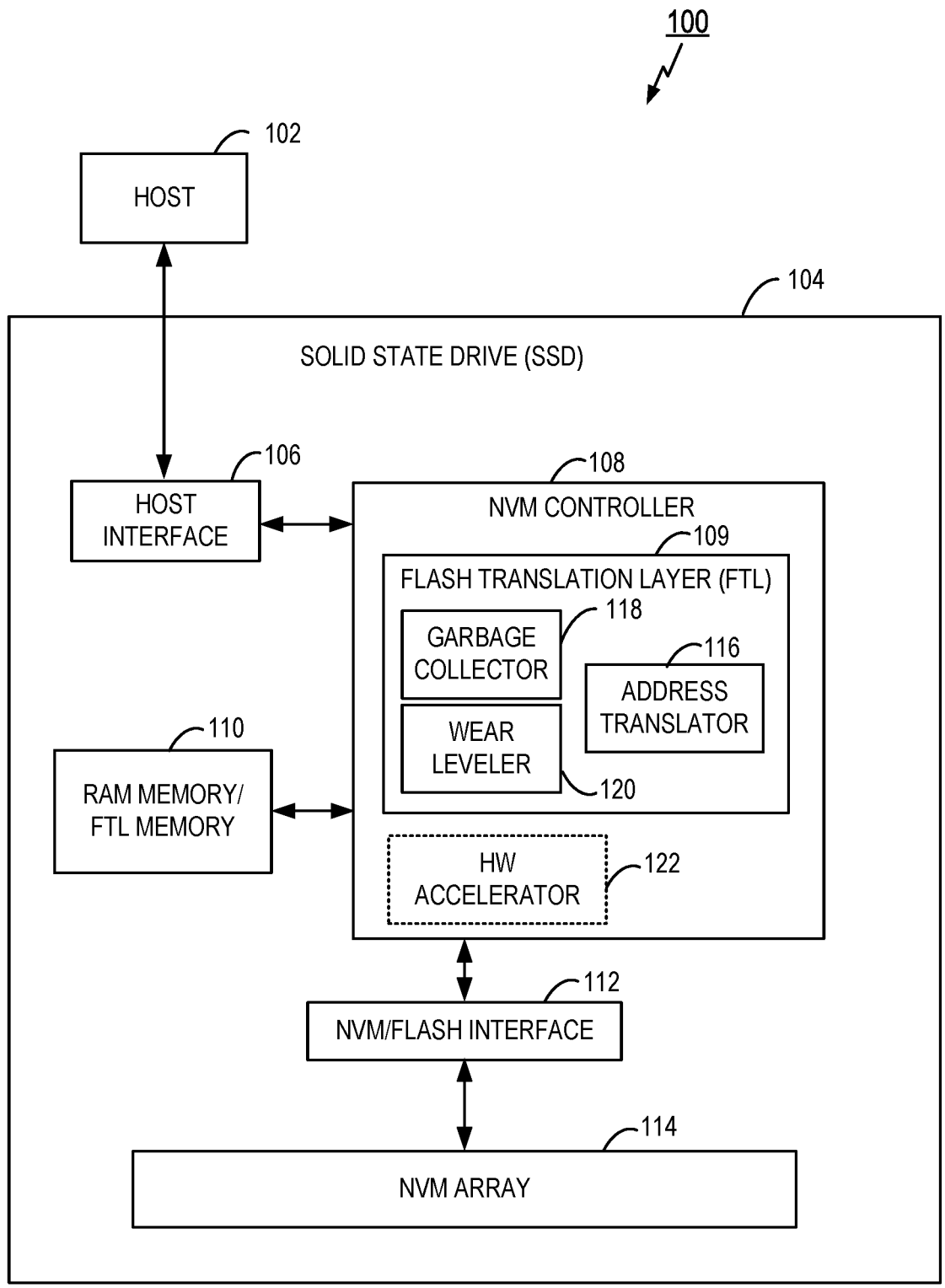
FIG. 1 is a block diagram of an exemplary solid state device (SSD) in which FTL control may be performed in accordance with embodiments of the present disclosure.

The present disclosure provides methods and apparatus for Flash Translation Layer (FTL) control or management. In order to efficiently manage recycle and reduction of write amplification, FTL control is configured to partition the logical blocks into hot and cold blocks based on the frequency of access of the blocks, wherein such blocks are also traditionally known as subdrives in an SSD. Thus, the present disclosure provides a hot subdrive that holds all the hot or frequently accessed logical pages and a cold subdrive that holds all the cold or less frequently accessed logical pages. In an aspect, it is noted that logical pages may be grouped into hot or cold regions based on the frequency of write requests. The particular frequency of write requests may vary. For example, in one aspect any host write may be considered as a hot write. In other aspects, however, the particular frequency of write requests can also be based on a predetermined threshold, where the FTL is configured to count the number of updates within a specific time period and once the number crosses the predetermined threshold, the logical page is then marked as a hot page Before discussing the present methods and apparatus, it is noted that in known solutions for addressing the size of an L2P table, a host logical page size is increased. For example, the host logical page size may be increased from 4 KB to 8 KB, which allows the size of L2P table to be reduced by half. With a logical page size of 8 KB, however, any random write of a size less than 8 KB needs to do a read-modify-write. This causes both performance and endurance problems, which are only exacerbated as the capacity of an SSD is increased; e.g., a 16 TB SSD with a 16 KB logical page resulting in the need for a read-modify-write for any write less than 16 KB. Also, the increase in logical page size by a factor of two, for example, will result in double write amplification. Accordingly, this is not a feasible and scalable solution as the sizes of SSDs are increased.

Another known solution is to partially load the L2P table into RAM at run time. For example, for a 16 TB SSD with a 16 GB L2P table, only a portion of the L2P table, such as 2 GB of the table in RAM, is stored. The remaining 14 GB of L2P table stays in the NVM (e.g., a NAND memory). The L2P entries stored in RAM are based on any traditional caching algorithm based on the host I/O pattern. During host read or write, if the request is for the logical page whose mapping is available in RAM (i.e. L2P table cache hit), then the FTL can just complete the command to the corresponding physical page. However, if the L2P table entry is not currently available then the FTL needs to first issue a read of the L2P table entry from the NVM (e.g., a NAND flash memory) into RAM and then it can complete the operation. This methodology thus potentially adds to latency in host read and write operations.

In light of the known solutions, the presently disclosed methods and apparatus for providing FTL control by maintaining different logical page sizes for hot and cold subdrives are advantageous for reducing the size of the L2P table, as well as keeping latency lower and not increasing write amplification.

Referring to the drawings, FIG. 1 is a block diagram of a system 100 including an exemplary solid state device (SSD) in which the disclosed FTL control or management may be implemented in accordance with aspects of the disclosure. The system 100 includes a host 102 and a SSD storage device 104 coupled to the host 102. The host 102 provides commands to the SSD storage device 104 for transferring data between the host 102 and the SSD storage device 104. For example, the host 102 may provide a write command to the SSD storage device 104 for writing data to the SSD storage device 104 or read command to the SSD storage device 104 for reading data from the SSD storage device 104. The host 102 may be any system or device having a need for data storage or retrieval and a compatible interface for communicating with the SSD storage device 104. For example, the host 102 may a computing device, a personal computer, a portable computer, a workstation, a server, a personal digital assistant, a digital camera, or a digital phone as merely a few examples.

The SSD storage device 104 includes a host interface 106, a controller 108 (or alternatively, an NVM controller 108), which also includes am FTL 109, a RAM memory or FTL memory 110, a non-volatile memory (NVM) interface 112 (which may also be referred to as a Flash memory interface), and a non-volatile memory (NVM) 114, such as a NAND Flash memory, for example. The host interface 106 is coupled to the controller 108 and facilitates communication between the host 102 and the controller 108. Additionally, the controller 108 is coupled to the RAM memory 110 as well as the NVM 114 via the NVM interface 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD storage device 104. In other embodiments, the SSD storage device 104 is remote with respect to the host 102 or is contained in a remote competing system communicatively coupled with the host 102. For example, the host 102 may communicate with the SSD storage device 104 through a wireless communication link.

The controller 108 controls operation of the SSD storage device 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD storage device 104. In some aspects, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The RAM memory 110 may be any memory, computing device, or system capable of storing data. For example, the memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory.

The NVM 114 receives data from the controller 108 via the NVM interface 112 and stores the data. The NVM 114 may be any type of non-volatile memory, such as a flash storage system, a NAND-type flash memory, a solid state drive, a flash memory card, a secure digital (SD) card, a universal serial bus (USB) memory device, a CompactFlash card, a SmartMedia device, a flash storage, array, or the like.

In the example of FIG. 1, read requests will generally comprise, a request from the host 102 via the interface 106 to read the data within a given logical Page address associated with the NVM 114. Each logical Page address is associated with a specific physical address within the NVM 114 through the use of the Logical to Physical (L2P) table maintained by the system controller 108, and more particularly by the FTL 109. In general, the table maps each logical Page address to a physical Page address within the NVM 114. The use of logical Page addresses and a logical-to-physical Page address conversion allows the controller 108 to effectively manage the memory within the NVM 114 and to implement various mapping and mechanisms, including the disclosed L2P table using hot and cold subpages.

In a further aspect, the FTL 109 may include an address translator 116 for effectuating the translation between logical and physical addresses, as well as to, in part, implement the L2P table. Furthermore, the FTL 109 may include a garbage collector process, module, or algorithm 118 that copies valid data into new or free areas and erases invalid data in physical block locations of the NVM 114 in order to free this invalid memory space. Still further, the FTL 109 may include a wear leveler process, module, or algorithm 120 used to ensure that erasures and re-writes are distributed evenly across the NVM 114.

Figure 2:
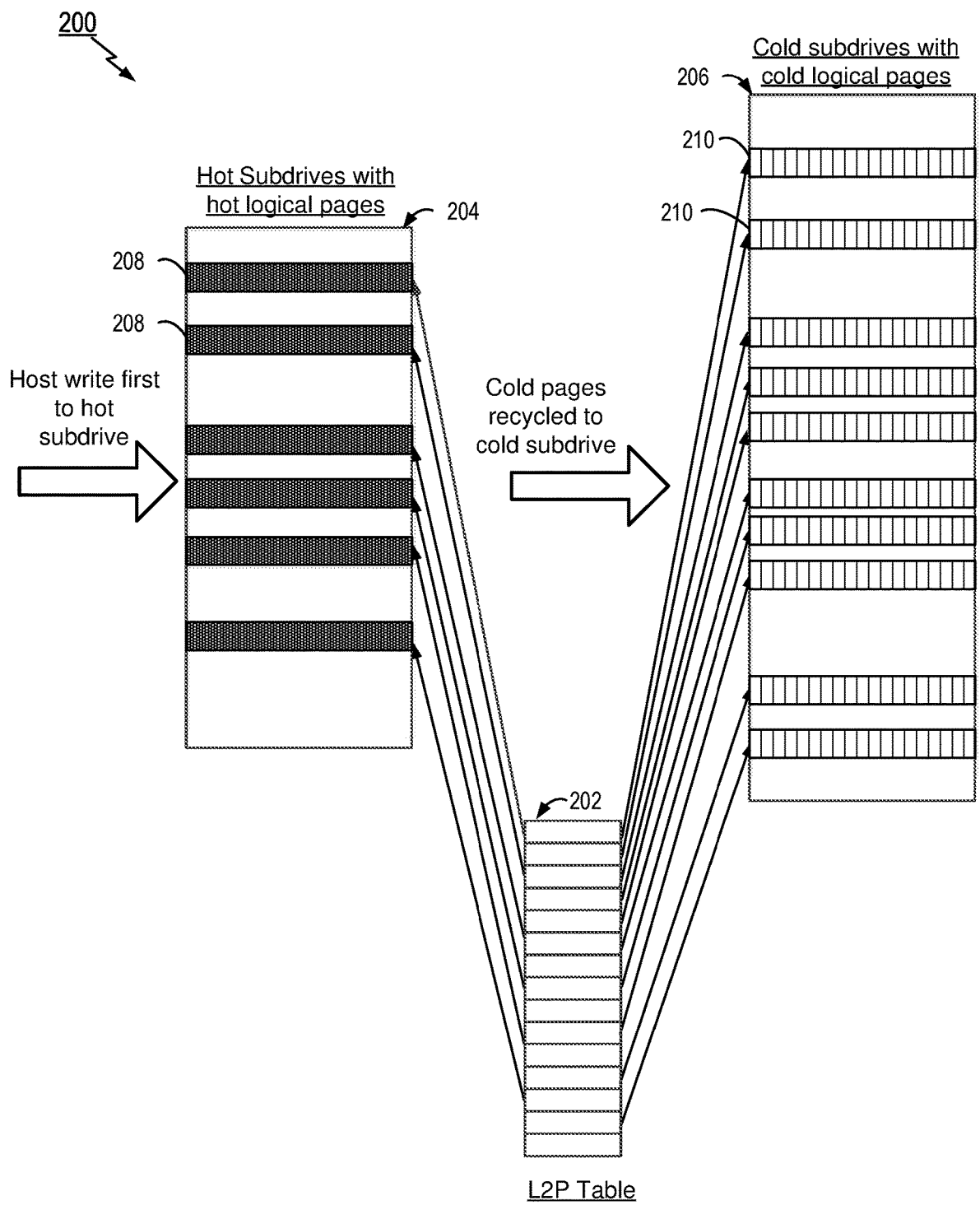
FIG. 2 is a diagram illustrating a logical to physical address table with hot and cold subdrive partitioning that may be implemented by an FTL.

FIG. 2 is a diagram illustrating an exemplary logical to physical address system 200 employing a L2P table 202 that maps to partitioned hot and cold subdrives that may be implemented by an FTL, such as FTL 109. For efficient management of the recycling of physical memory locations and the reduction of write amplification, the FTL may be configured to partition blocks into hot and cold blocks or subdrives as illustrated by hot subdrive 204 and cold subdrive 206. As described before, a hot subdrive holds all the hot logical pages and cold subdrive holds all the cold logical pages. In such architecture, any new host write will first go to the hot subdrive 204. From the hot subdrive 204, any logical page that is not overwritten or, in other words, is valid may then be recycled onto a block in the cold subdrive (e.g., block 210 in subdrive 206). For a memory workload in a steady state, which does not change the hot data region, hot and cold logical pages get partitioned onto the hot and cold subdrives. Regardless of the hoi or cold nature of a region, the L2P table 202 maintains the mapping of logical pages to the hot or cold subdrives 204, 206 as illustrated in FIG. 2.

The present disclosure presents methods and apparatus that utilize a partitioned system of hot and cold subdrives such as that illustrated in FIG. 2 along with variable or different logical page sizing of at least the cold blocks within the respective cold subdrive in order to reduce the size of the L2P table, particularly for high capacity SSDs. In an aspect, when the host writes data to the NVM, the size of which may be a 4 KB logical page size, the data will always be first written to the hot subdrive having a 4 KB block. Accordingly, this mapping does not require any read modify write overhead as the size of the logical page and subdrive block are the same. At the same time, the cold data, which are modified less, are maintained at larger logical page size. So, even though there will be read modify write for writes to the cold subdrive, the performance and endurance impact due to that would be much less. Then, for any given memory workload, usually the cold region size is much higher compared to hot region, thereby resulting much larger blocks being managed with large logical page size, which affords significant reduction the L2P table size.

Figure 3:
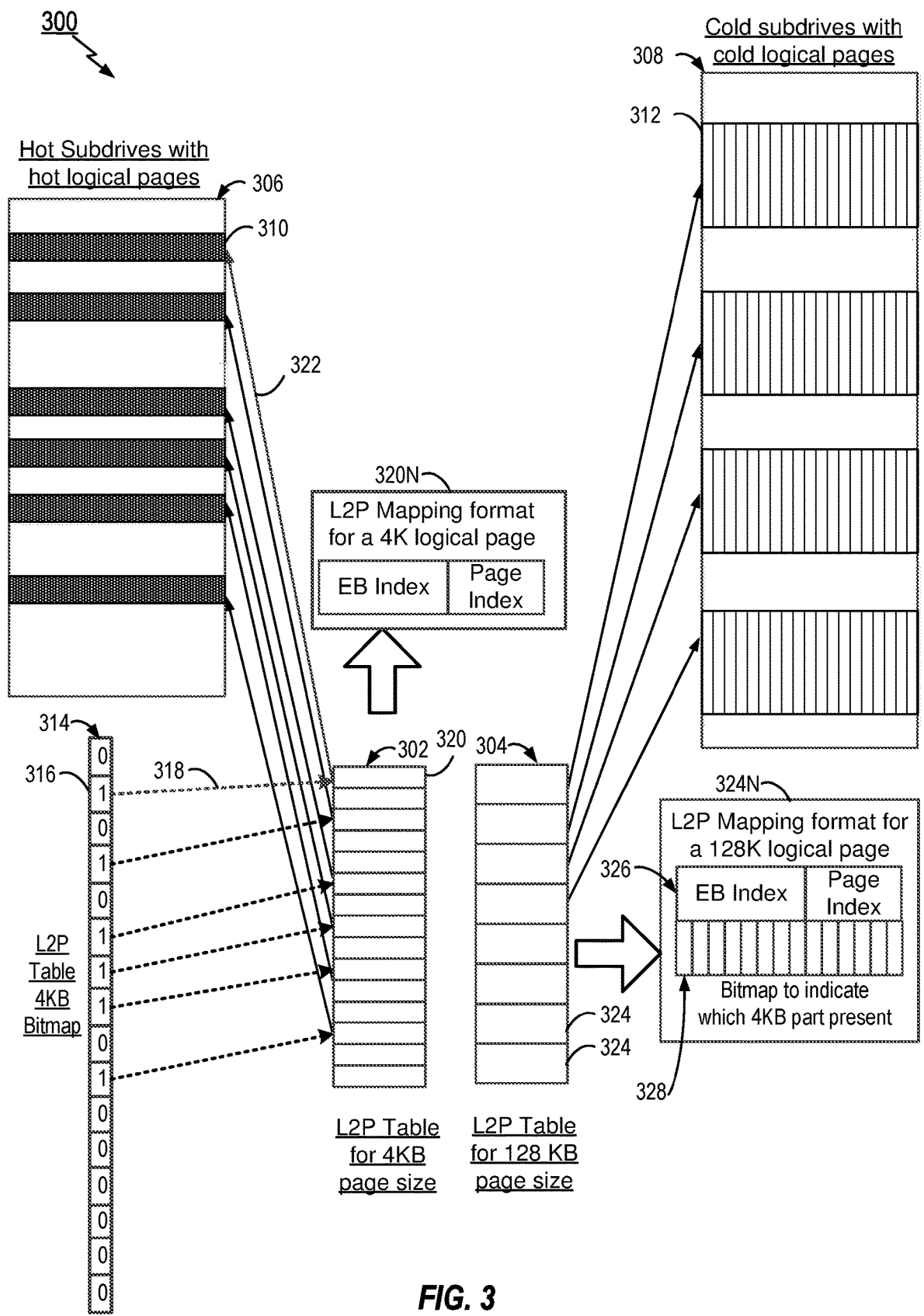
FIG. 3 is a diagram illustrating another exemplary logical to physical address table with hot and cold subdrive partitioning and variable block sizes that may be implemented by an FTL in accordance with embodiments of the present disclosure.

FIG. 3 illustrates an exemplary architecture 300 that subdivides an L2P table into hot and cold subdrives based on whether data is one of a hot or cold logical page, while also including at least a variable or different block, size for cold data stored in the cold subdrive. In a particular aspect, the cold data, which are less modified less than hot data, are maintained at a larger logical page size. Thus, even though there will be a read modify write for writes to the cold subdrive due to the larger block size, the performance and endurance impact will be mitigated because the nature of the cold data is that it is modified less. As the cold region size in the cold subdrive is maintained with much higher block sizes compared to the hot subdrive, this resulting in much larger blocks being managed with a large logical page size, which reduces the L2P table size significantly.

As may be seen in FIG. 3, the L2P table is bifurcated into two sections 302 and 304, which respectively map logical addresses to hot and cold subdrives 306 and 308. In the illustrated example of FIG. 3, the hot subdrive 306 includes logical pages 310 each having a size of 4 KB to match the typical logical page size of data writes by the controller 108. In another aspect, the cold subdrive 308 includes logical pages 312 each having a size of 128 KB for cold data, although this sizing is merely exemplary and may be less or greater depending on the particular sizes of the SSD.

Moreover, the controller 108 and the FTL 109 (or combinations thereof, as well as other logic/processing circuitry in other aspects) may maintain a bitmap 314 accounting for each 4 KB logical page mapped to the L2P table(s) 302, 304. In particular, bitmap 314 is used to indicate whether the logical page mapping of a page is available in the hot subdrive 306 or the cold subdrive 308. Each entry in the bitmap 314 corresponds to a logical page and each entry of the bitmap 314 may include a single binary bit where one state (e.g., "1") indicates that the logical page mapping of the particular page is available (or can be searched for) in L2P table 302 corresponding to the 4 KB logical page data mapped to the hot subdrive 306. If the bit is in the other state (e.g., "0" or not set) this then indicates that the other L2P table 304 should be searched for the corresponding mapped block in the cold subdrive 308. As an example, if a bitmap entry 316 is set at value "1", then the controller 108 or FTL 109 will be directed or configured to search for the mapping of the logical page in the L2P table 302 as illustrated by arrow 316. The L2P mapping in entry 320, for example, contains the mapping information, which directs the controller 108 to the physical block location 310, for example. When the bitmap value is not set or is of value "0" in the illustrated example, then the controller 108 may search the L2P table 304 for mapping to the cold subdrive 308 to access the logical page block (e.g., 312).

The L2P address mapping format for each entry in the hot and cold L2P tables 302 and 304 is further illustrated in FIG. 3. An exemplary address mapping format 320N is indicative of each entry in the hot L2P table 302. The address 320N includes a 4 byte field of the physical address including an erase block (EB) index and a page index, where the EB index is the index of the erase block in the hot subdrive 306 and the page index is an index of the page within the erase block EB. For the cold mapping L2P table 304, an exemplary address mapping format 324N of entries 324 in table 304 according to the presently disclosed methods and apparatus is shown. The address 324N may be comprised of 8 bytes, where the first 4 bytes 326 indicates the physical address of the 128 KB mapping to the physical cold subdrive 308. The physical address comprises an erase block index (EB Index) and a page index, where the EB index implies the index of erase block within the cold subdrive 308 and the page index is the index of the page within the erase block. In an additional (and optional) aspect, a next 4 byte field (i.e., 32 bits) 328 may be used to indicate which 4 KB parts of the 128 KB logical page are available in the cold subdrive 308. Thus, in an aspect it is possible to have a number of 4 KB portions of the 128 K logical page actually stored in hot subdrive 306 and rest of the portions stored in cold subdrive 308. Of further note, the 4 byte field or 32 bit field 328 may be configured as a bitmap where each bit state in the 32 bit field is used to indicate whether a corresponding 4 KB page portion of the 128 KB page is in the cold subdrive 308 or the hot subdrive 306.

In a further aspect, it is noted that the L2P tables 302 and 304 may both be stored in DDR RAM (e.g. 110 in FIG. 1) which affords better latency. That is, since the L2P cold mapping table 304 uses a 4 or 8 byte address to map to larger blocks of data (e.g., 128 KB), the whole L2P table (i.e., tables 302 and 304) may be contained in RAM memory. According to still an additional aspect, it is noted that in SSD devices hidden searches often may be performed. Accordingly, the controller 108 may feature a hardware accelerator (e.g., HW accelerator 122) to accelerate searches in the RAM, which may be particularly beneficial for searches of the hot 4 KB table 302.

In operation, during an L2P lookup or read for a logical page, the system 300 will operate, where the controller 108 will first check for the logical page mapping in L2P hot table 302 with the use of bitmap 314. If the page is not there, then the controller 108 is configured to look up the page in L2P cold table 304. Once the lookup is complete, the controller 108 is configured to then complete the read from the corresponding subdrive 306 or 308 storing the desired logical page.

During a host write, the system 300 and controller 108 may be configured to first write to the hot subdrive 306. The controller 108 is then configured to look up for the logical page in both the hot and cold subdrives 306, 308 and mark a previous mapping invalid. According to another aspect in case of the cold subdrive 308, instead of marking the previous mapping, it may be possible to reset, update, or toggle a bit of the 128 KB mapping bitmap. It is noted that according to alternative aspects, the controller 108 may also be configured to not necessarily first write to the hot subdrive 306 dependent on the data size. For example, if the logical data page is above a predetermined threshold, then the controller 108 may be configured to write to cold subdrive 308 (also conditional upon whether the data is indeed cold data that will not be frequently accessed).

According to another aspect of the presently disclosed methods and apparatus, it is noted that during a recycle from the hot subdrive 306 to the cold subdrive 308, the controller 108 may be configured to accumulate the 4 KB logical pages belonging to a 128 KB logical page unit. The controller 108 may then combine the pages in a same location. In a particular aspect, this process may be accomplished in conjunction with the garbage collection by garbage collector 118, for example. That is, the controller 108 is configured to combine pages identified from garbage collection from 4 k or 128 k sizes and combine them into a 128 k block for storage in the cold subdrive 308.

Of further note concerning the cold and hot subdrives 306, 308, the L2P mapping performed by controller 108 and FTL 109 is operable according to some aspects such that only the EB index is stored within the hot and cold subdrives 306, 308, and not the EB number itself. This is done because normally each L2P table entry (e.g., 4 byte entry) needs to have the complete mapping of a die index, an EB number, and a page number. As the technology moves toward larger capacity, however the number of bits needed to represent die index/EE number/page number becomes larger than 32 bits, thus presenting a problem with the width exceeding to available width. Accordingly, the use of an EB Index provides another logical layer for indexing that effectively extends the range of the L2P mapping, but without adding to the size of the L2P table(s) 302, 304. The actual translation of the EB index to the EB number may be implemented within the controller 108 by an EB number to EB index table or similar construct, which may be further implemented in software, hardware, firmware, or combinations thereof. Storing only the index helps in addressing larger number of erase blocks within a subdrive and helps to mitigate width problems inherent in L2P table mapping.

The present methods and apparatus partition the EBs into hot and cold subdrives and the number of EBs in hot subdrives will be less. Accordingly, the number of bits needed to store the EB index in hot subdrives is reduced and, thus, economized. Similarly for the cold subdrive, the mapping of larger pages may be economized. For example, if a 128 K page is mapped, five bits will be saved for the page number in the L2P table. Furthermore, by storing an EB index within the subdrive, instead of an absolute EB number, more bits may be saved. For example, if the EBs are distributed equally between the two subdrives, then just storing the EB index with respect to the subdrive will save one bit.

Of yet further note, if the erase blocks are split equally between the two subdrives 306 and 308 the presently disclosed methods and apparatus may provide for addressing up to 32 TB with the disclosed methods and apparatus without increasing the size of the L2P table(s). As will be appreciated by those skilled in the art, the size of the logical blocks in the subdrives of the example of FIG. 3 are merely exemplary, and the sizing may be greater or less dependent upon the capacity of the SSD. Additionally, the size of the logical blocks and pages may not be fixed to only one size (e.g., 128 KB) but could be variable in some aspects, and different among the different logical blocks stored in the subdrives, particularly the cold subdrive 308.

Figure 4:
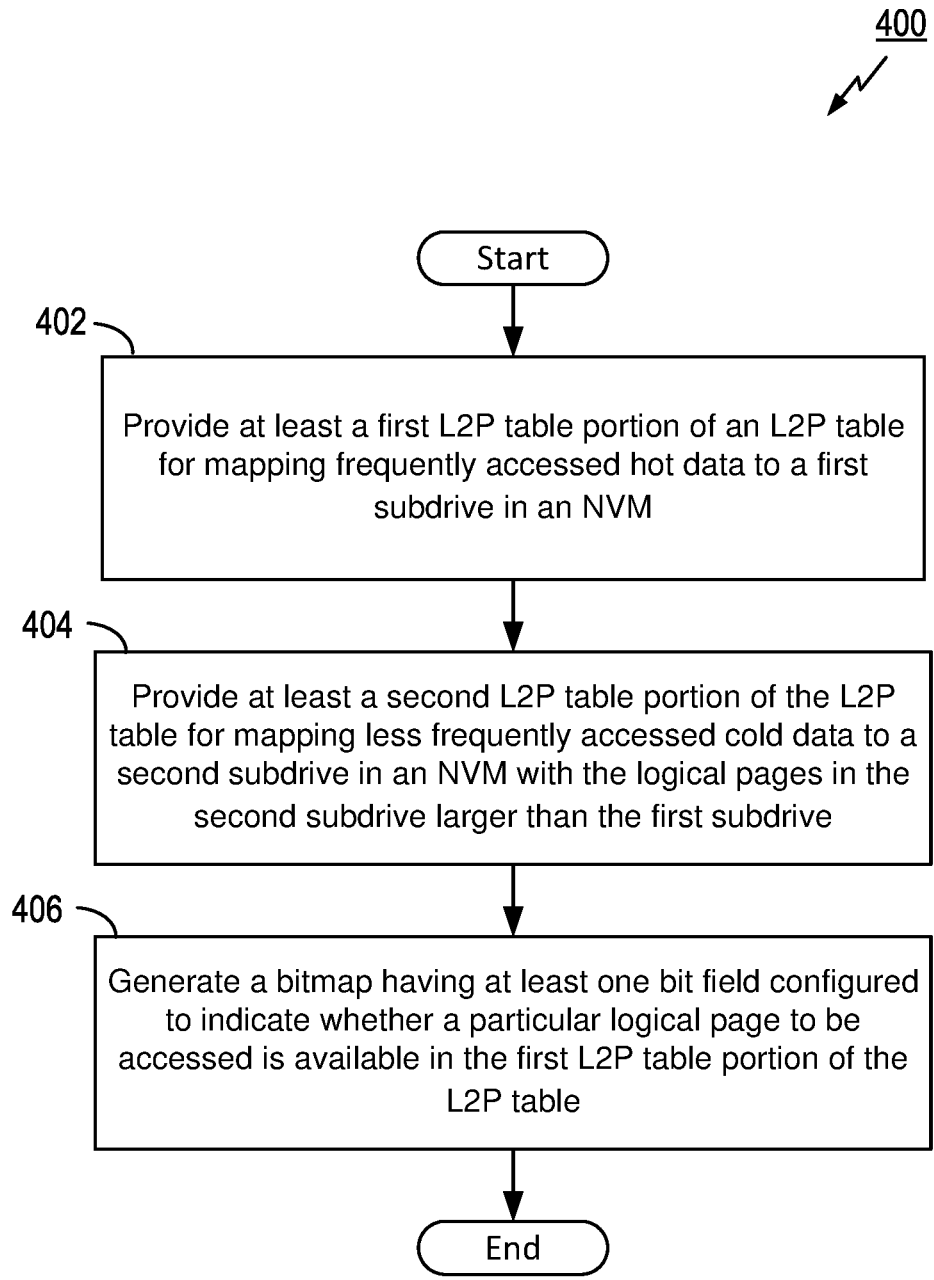
FIG. 4 illustrates a flow diagram of an exemplary method for FTL control in accordance with the present disclosure.

FIG. 4 illustrates a flow diagram of an exemplary method 400 for SSD control and, more specifically, FTL control in accordance with aspects of the present disclosure. Method 400 includes generating, providing, or setting a logical to physical (L2P) table (e.g., tables 302, 304) with an NVM and/or FTL controller (e.g., 108 and/or 109). The method 400 includes providing a first L2P table portion of the L2P table for mapping frequently accessed hot data to a first subdrive (e.g., a hot L2P subdrive such as 306) in the NVM as shown at block 402, which is embodied in one aspect by hot L2P table 302 in FIG. 3. Furthermore, method 400 includes providing a second L2P table portion of the L2P table for mapping cold data less frequently accessed than the hot data to a second subdrive in the NVM (e.g., cold subdrive 308) as shown at block 404. The second portion of the L2P table is embodied in one aspect by cold L2P table 304 in FIG. 3. Furthermore, the logical blocks for storing the cold data in the second subdrive are configured to be larger than logical blocks for storing the hot data in the first subdrive as may be seen by comparing blocks 310 and 312 in FIG. 3. In one embodiment, the block size of the first subdrive may be 4 KB, whereas the block size of the second subdrive is 128 KB.

Method 400 further includes generating, maintaining, providing, or setting a first bitmap having at least one bit field configured to indicate whether a particular logical page to be accessed is available in the first L2P table portion of the L2P table as shown in block 406. This first bitmap may be embodied as shown at 314 in FIG. 3, wherein each bit value (e.g., "0" or "1") may be used to indicate whether or not a particular page is available in the hot L2P table 302. It is noted that processes in blocks 402, 404, and 406 may be performed by the controller 108, FTL 109, the controllers 108 and 109 in combination with the host 102. Additionally, the setting of the tables and bitmap may be set and stored by the controller in the RAM memory 110.

While not shown in FIG. 4, method 400 may further include accessing the at least one bit field in the first bitmap to determine whether the particular logical page to be accessed is available in the first L2P table portion of the L2P table during a page lookup by the NVM controller. This may be embodied as bitmap 314 and operable according to processes disclosed earlier heroin. Method 400 may further include accessing a particular logical page from the first subdrive using the first L2P table portion of the L2P table when the at least one bit field indicates that the particular logical page to be accessed is available in the first L2P table portion (See e.g., bit value/field 316 in FIG. 3) and then searching the second L2P table portion of the L2P table for mapping for the particular logical page when the at least one bit field indicates that the particular logical page to be accessed is not available in the first L2P table portion. These processes may be effectuated by the controller 108 or FTL controller 109, as examples.

As discussed before in connection with FIG. 3, each of the first and second L2P table portions of the L2P table (302, 304) include a plurality of entries each containing a logical page mapping comprising an erase block (EB) index and a page index that map a logical address to a physical address in the respective first subdrive and second subdrive as may be seen in formats 320N and 324N in FIG. 3, as examples. Moreover, at least one of the plurality of entries in the second L2P table portion further comprises a second bitmap (See e.g., 328 in FIG. 3) configured to indicate one or more portions of a logical page stored in the first subdrive and one or more portions stored in the second subdrive.

Other features and processes of method 400 may include mapping each of the EB index values to an EB number with the NVM controller, implementing the first and second L2P table portions of the L2P table in a DDR RAM memory (e.g., 110) in communication with the NVM controller (e.g., 108 and/or 109). Other processes that may be effectuated by method 400 include initially writing data to the first subdrive for all data to be stored in the NVM by a host device (e.g., 102), and, during writing of data by the host device, searching for a logical page in first and second subdrives, as well as marking a previous mapping invalid when the logical page is found from the search.

Method 400 may further include recycling data from the first subdrive to the second subdrive when the data is determined to be cold data including accumulating logical pages from the first subdrive that belong to a larger logical page unit to be stored in the second subdrive, and then combining the accumulated logical pages and storing the pages as the larger logical page unit in the second subdrive.

According to another aspect, a non-volatile memory (NVM) device including an apparatus for control a flash translation layer (FTL) in the NVM device is disclosed. The apparatus may include means for generating a logical to physical (L2P) table including a first L2P table portion of the L2P table for mapping frequently accessed hot data to a first subdrive in the NVM, and a second L2P table portion of the L2P table for mapping cold data less frequently accessed than the hot data to a second subdrive in the NVM, wherein logical blocks for storing the cold data in the second subdrive are configured to be larger than logical blocks for storing the hot data in the first subdrive. This means for generating the L2P table may be implemented by structure such as controller 108, controller 109, or one or more of controllers 108 and 109 in combination with one or more of memory 110, NVM 114, and host 102, and equivalents thereof such as logic circuitry or a dedicated processor. Additionally, this means may be further implemented with particular functional blocks or circuits such as address translator 116, garbage collector 118, wear leveler 120, and/or hardware accelerator 122.

The apparatus further may include means for providing, maintaining, or generating a first bitmap (e.g., 314 in FIG. 3) having at least one bit field configured to indicate whether a particular logical page to be accessed is available in the first L2P table portion of the L2P table. This means for setting a first bitmap, such as bitmap 314 illustrated in FIG. 3, may be implemented by structure such as controller 108, controller 109, or one or more of controllers 108 and 109 in combination with one or more of memory 110, NVM 114, and host 102, and equivalents thereof such as logic circuitry or a dedicated processor.

In another aspect, the disclosed apparatus may further include means for examining at least one bit field in the first bitmap to determine whether the particular logical page to be accessed is available in the first L2P table portion of the L2P table during a page lookup by the NVM controller. Additionally, the apparatus may include means for accessing the particular logical page from the first subdrive using the first L2P table portion of the L2P table when the at least one bit field indicates that the particular logical page to be accessed is available in the first L2P table portion. Finally, the apparatus may include means for searching the second L2P table portion of the L2P table for mapping for the particular logical page when the at least one bit field indicates that the particular logical page to be accessed is not available in the first L2P table portion. These means may be implemented by structure such as controller 108, controller 109, or one or more of controllers 108 and 109 in combination with one or more of memory 110, NVM 114, and host 102, and equivalents thereof such as logic circuitry or a dedicated processor. Additionally, this means may be further implemented with particular functional blocks or circuits such as address translator 116, garbage collector 118, wear leveler 120, and/or hardware accelerator 122.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple, may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to, the disclosed example embodiments.

What is claimed is:

1. A method of managing a flash translation layer (FTL) for a non-volatile memory (NVM), the method comprising:
providing a logical to physical (L2P) table with an NVM controller that includes:
bifurcating the L2P table into a first L2P table portion and a second L2P table portion, wherein the first L2P table portion and the second L2P table portion are different from and non-overlapping with each other,
wherein the first L2P table portion of the L2P table maps frequently accessed hot data to a first subdrive in the NVM, and
wherein the second L2P table portion of the L2P table maps cold data less frequently accessed than the hot data to a second subdrive in the NVM, wherein logical blocks for storing the cold data in the second subdrive are configured to be larger than logical blocks for storing the hot data in the first subdrive;
generating a first bitmap that is separate from the first and second L2P table portions of the L2P table, the first bitmap having at least one bit field configured to indicate whether a logical page mapping of a particular logical page to be accessed is located in the first L2P table portion of the L2P table;
reading the at least one bit field in the first bitmap for an indication of whether the logical page mapping of the particular logical page to be accessed is located in the first L2P table portion or the second L2P table portion; and
performing, responsive to the reading of the at least one bit field, a lookup of the particular logical page mapping in the first L2P table portion or the second L2P table portion based on the indication.

2. The method of claim 1,
wherein the reading the at least one bit field comprises accessing the at least one bit field in the first bitmap during a page lookup by the NVM controller, the method further comprising:
accessing the particular logical page from the first subdrive using the first L2P table portion of the L2P table when the at least one bit field indicates that the logical page mapping of the particular logical page to be accessed is located in the first L2P table portion, and
searching the second L2P table portion of the L2P table for the logical page mapping of the particular logical page when the at least one bit field indicates that the logical page mapping of the particular logical page to be accessed is not located in the first L2P table portion.

3. The method of claim 1, further comprising:
each of the first and second L2P table portions of the L2P table including a plurality of entries each containing a logical page mapping comprising an erase block (EB) index and a page index that map a logical address to a physical address in the respective first subdrive and second subdrive.

4. The method of claim 3, wherein at least one of the plurality of entries in the second L2P table portion further comprises a second bitmap configured to indicate one or more portions of a logical page stored in the first subdrive and one or more portions stored in the second subdrive.

5. The method of claim 3, further comprising:
mapping EB index values to respective EB numbers with the NVM controller.

6. The method of claim 1, wherein the first and second L2P table portions of the L2P table are implemented in a DDR RAM memory in communication with the NVM controller.

7. The method of claim 1, further comprising:
initially writing data to the first subdrive for all data to be stored in the NVM by a host device.

8. The method of claim 7, further comprising:
during writing of data by the host device, searching for a logical page in the first and second subdrives; and
marking a previous mapping invalid when the logical page is found from the search.

9. The method of claim 1, further comprising:
recycling data from the first subdrive to the second subdrive when the data is determined to be cold data including accumulating logical pages from the first subdrive that belong to a larger logical page unit to be stored in the second subdrive; and
combining the accumulated logical pages and storing the pages as the larger logical page unit in the second subdrive.

10. A solid state drive (SSD) comprising:
a non-volatile memory (NVM); and
a controller communicatively coupled to a host device and the NVM, wherein the controller is configured to:
generate a logical to physical (L2P) table that includes:
bifurcating the L2P table into a first L2P table portion and a second L2P table portion, wherein the first L2P table portion and the second L2P table portion are different from and non-overlapping with each other,
wherein the first L2P table portion of the L2P table maps frequently accessed hot data to a first subdrive in the NVM, and
wherein the second L2P table portion of the L2P table maps cold data less frequently accessed than the hot data to a second subdrive in the NVM, wherein logical blocks for storing the cold data in the second subdrive are configured to be larger than logical blocks for storing the hot data in the first subdrive, and
maintain a first bitmap that is separate from the first and second L2P table portions of the L2P table, the first bitmap having at least one bit field configured to indicate whether a logical page mapping of a particular logical page to be accessed is located in the first L2P table portion of the L2P table,
read the at least one bit field in the first bitmap for an indication of whether the logical page mapping of the particular logical page to be accessed is located in the first L2P table portion or the second L2P table portion, and
perform, responsive to the read of the at least one bit field, a lookup of the particular logical page mapping in the first L2P table portion or the second L2P table portion based on the indication.

11. The solid state drive of claim 10,
wherein the controller configured to read the at least one bit field is configured to access the at least one bit field in the first bitmap during a page lookup by the controller; and
wherein the controller is further configured to:
access the particular logical page from the first subdrive using the first L2P table portion of the L2P table when the at least one bit field indicates that the logical page mapping of the particular logical page to be accessed is located in the first L2P table portion, and search the second L2P table portion of the L2P table for the logical page mapping of the particular logical page when the at least one bit field indicates that the logical page mapping of the particular logical page to be accessed is not located in the first L2P table portion.

12. The solid state drive of claim 10, wherein each of the first and second L2P table portions of the L2P table including a plurality of entries each containing a logical page mapping including an erase block (EB) index and a page index that map a logical address to a physical address in the respective first subdrive and second subdrive.

13. The solid state drive of claim 12, wherein at least one of the plurality of entries in the second L2P table portion further comprises a second bitmap configured to indicate one or more portions of a logical page stored in the first subdrive and one or more portions stored in the second subdrive.

14. The solid state drive of claim 10, wherein the controller is further configured to implement the first and second L2P table portions of the L2P table in a DDR RAM memory in communication with the controller.

15. The solid state drive of claim 10, wherein the controller is further configured to:
   initially write all data to be stored by the host device in the first subdrive,
   search for a logical page in the first and second subdrives during writing of data by the host device; and
   mark a previous mapping invalid when the logical page is found from the search.

16. The solid state drive of claim 10, wherein the controller is further configured to:
   recycle data from the first subdrive to the second subdrive when the data is determined to be cold data including accumulating logical pages from the first subdrive that belong to a larger logical page unit to be stored in the second subdrive; and
   combine the accumulated logical pages and storing the pages as the larger logical page unit in the second subdrive.

17. The method of claim 1, wherein an entirety of the L2P table including the first and second L2P table portions is stored in a DDR RAM memory.

18. The solid state drive of claim 10, wherein the controller is further configured to store an entirety of the L2P table including the first and second L2P table portions in a DDR RAM memory.

* * * * *